United States Patent [19]
Kalota

[11] Patent Number: 5,525,703
[45] Date of Patent: Jun. 11, 1996

[54] CROSSLINKED POLYASPARTIC ACID AND SALTS

[75] Inventor: Dennis J. Kalota, Fenton, Mo.

[73] Assignee: Monsanto Company, St. Louis, Mo.

[21] Appl. No.: 364,634

[22] Filed: Dec. 27, 1994

[51] Int. Cl.$^6$ .................................................. C08G 69/48
[52] U.S. Cl. .................... 528/363; 528/332; 528/335; 528/345; 525/421; 525/422
[58] Field of Search .................... 525/421, 422, 525/435; 528/332, 335, 345, 363

[56] References Cited

U.S. PATENT DOCUMENTS

| | | | |
|---|---|---|---|
| 3,846,380 | 11/1974 | Fujimoto et al. | 525/328.2 |
| 4,332,928 | 6/1982 | Kluger et al. | 528/113 |
| 4,363,797 | 12/1982 | Jacquet et al. | 424/70 |
| 5,247,068 | 9/1993 | Donarchy et al. | 530/350 |
| 5,284,936 | 2/1994 | Donarchy et al. | 530/350 |
| 5,286,810 | 2/1994 | Wood | 525/421 |

FOREIGN PATENT DOCUMENTS 7727769 9/1977 France.
7812516 4/1978 France.

OTHER PUBLICATIONS

"Water Soluble Polyamides as Potential Drug Carriers", pp. 35–50, Eberhard W. Neuse et al *Die Angewandte Makromolekulare Chemie* 192 (1991).
"Polymeric Micelles As Novel Drug Carriers and Virus Mimicking Vehicles", K. Kataoka et al, *Macromolecules* 1992, pp. 267–276.

*Primary Examiner*—Samuel A. Acquah
*Assistant Examiner*—P. Hampton-Hightower
*Attorney, Agent, or Firm*—R. C. Loyer

[57] ABSTRACT

There is disclosed novel cross linked polyanhydroaspartic acid which is the product of the reaction of a polysuccinidmide with triaminononoane (TAN). Depending upon the amount a cross linking agent employed compositions of varying degrees of cross linking are produced. Mole ratio of polysuccinimide to TAN such as from 3 to 1 provides a water insoluble material while a mole ratio of 102 to 1 provides a water soluble material at 28% by weight. Such compounds find utility as thickeners, deflocculants, flocculants and water absorbers.

11 Claims, No Drawings

CROSSLINKED POLYASPARTIC ACID AND SALTS

This invention relates to novel polymers derived from polysuccinimide otherwise known in the art as polyanhydroaspartic acid. Polysuccinimides are obtained by the thermal condensation of 1-aspartic acid by known means. More particularly, this invention relates to cross-linked polyaspartic acids and salts which are highly useful in various functions depending upon molecular weight.

BACKGROUND OF THE INVENTION

Early derivatives of polyimides such as polysuccinimides involved the straight forward ring opening and amide substitution of the carboxyl groups. Typically, primary or secondary amines were employed to amidate the carboxyl groups. Depending upon the degree of substitution and other reactive groups in the amine reactant, hydrophilic or hydrophobic compounds were made. A typical example of this is found in U.S. Pat. No. 3,846,380 to Fujimoto et al. In this patent the polysuccinimide is reacted with appropriate amines containing various functional groups followed by hydrolysis to open the succinimide rings not otherwise reacted with the amine reactant. The resulting polymer contained a wide range of properties useful as surface active agents. By selecting the kind and amount of the long chain amine used to form the resulting polymer, various physical and chemical properties could be readily obtained.

Amines have been known to react with the carboxyl group of polyaspartic acid or the anhyride, polyanhydroaspartic acid, as shown in French patent applications FR 78 12516 and 77 27769 to Jacquet et al. The amidation of some of the reactive sites of the imide or anhydride can be followed by one or more additional amines or hydrolyzed with a base. Such amides are suggested as being useful in cosmetic compositions such as hair shampoo, setting lotions, brushing lotions or dye depending upon the type and amount of amine employed in the amidation reaction. Most of these types of compounds are soluble in organic solvents such as alcohol.

Water soluble polyamides were investigated as possible drug carriers by Neuse, Perlwitz and Schmitt as reported in Die Angewandte Makromolekulare Chemie, 192 pp. 35–51 (1991). Twelve water soluble N-substituted polyaspartamides were synthesized form polysuccinimide by nucleophilic ring opening. The compounds contained solubilizing segments that comprise additional repeat units with drug-anchoring sites. Amine functions on side chains were obtained by using alkyl diamines such as 1,4 diamino heptane, 1-aminobutane, 1-amino octane, 1-(2-amino ethyl)piperazine, etc. The polymers had molecular weights in the range of from 6,000 to 8,000. More recently, polymeric micelles comprising block copolymers or polyethylene glycol and polyaspartic acid have been investigated as a possible drug carrier particularly in the treatment of tumors. The description of this investigation is found in Macromol. 1992, Invited Lect. IUPAC Int. Symp. Macromol., 34th (1993), Meeting date 1992, pp. 267–276, by K. Kataoka, et al.

It is known to cross-link polyaspartic acid and salts thereof by employing amines. An example of such compounds is found in U.S. Pat. No. 5,284,936 to Donachy et al. Such disclosure indicates that cross-linked polymers are prepared by the reaction of polyaspartic acid with an amino acids such as lysine, arganine, serine, tyrosine, etc. These compounds were found to be water insoluble and capable of absorbing water in amounts ranging from 20 to 90 times the weight of the dry polymer. In a related patent, U.S. Pat. No. 5,247,068, water insoluble cross-linked polypeptides are disclosed which are derived from lysine and glutamic acids in various mole percent ratios respectively.

As can be seen from the above noted publications, numerous different amines carrying various functional groups have been employed to produce polymers with different functions. Cross-linking of the polysuccinimide has been reported only with amino acids which are relatively expensive and limited as to useful end product.

BRIEF DESCRIPTION OF THE INVENTION

There has now been discovered a single, relatively inexpensive cross-linking agent for polyanhydroasparatic acid which has the ability to provide a range of polymers having diverse properties by simply controlling the amount of agent allowed to react with the polyanhydroaspartic acid. In accordance with this invention 4-aminomethyl-,1,8-diaminooctane, hereinafter referred to a triaminononane, abbreviated "TAN", has been found to provide a range of cross linked polymers derived from polysuccinimide. The reaction scheme is illustrated below wherein reaction I is typical of the reaction of an amine with polysuccinimide. However, in has been found that the unopened rings of the polysuccinimide further react easily with the other amine groups of TAN as shown in reaction II. Reaction II illustrates the cross-linking of the polymer by such ring opening reactions. For purposes of illustration only TAN residue (a) is shown in the reaction product of Reaction II. However, TAN residues (b) and (c) are easily envisioned wherein the amino groups of TAN are employed in the ring opening reaction with the polysuccinimide in Reaction II.

Reaction I

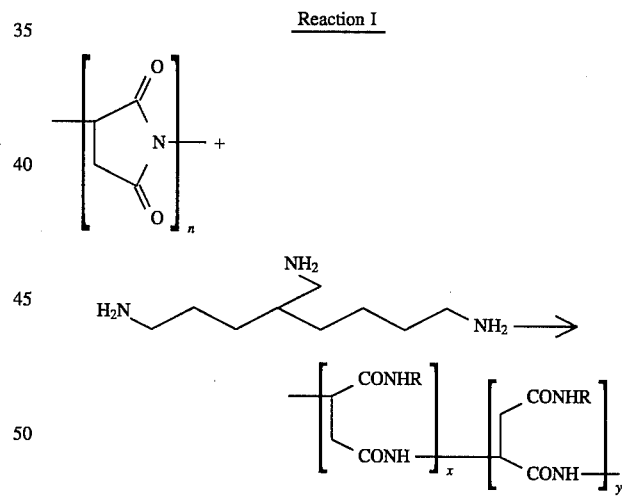

wherein n, x and y are positive integers and R is independently selected from TAN residues

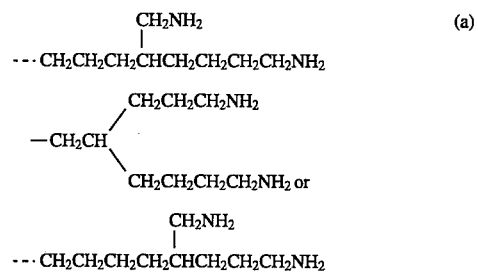

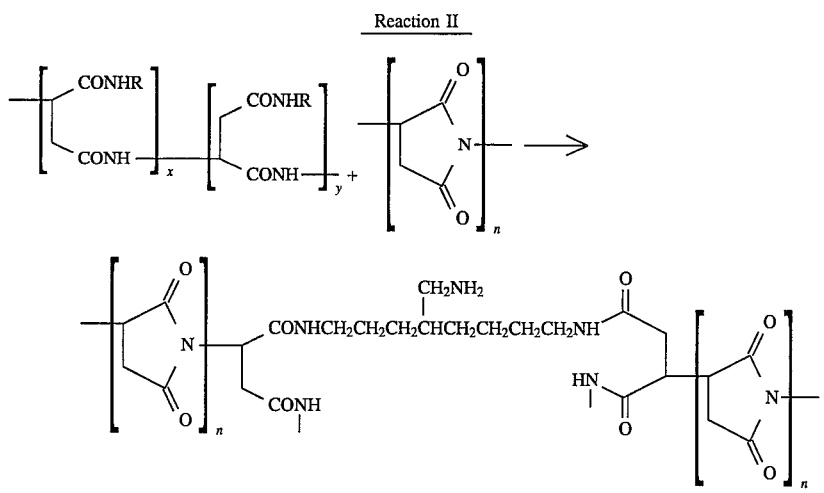

Reaction II wherein n, x and y are as described above.

Polymers of this invention are only illustrated partially by the product of Reaction II above as there as numerous possible cross-linking opportunities in the molecule for each of TAN residues (a)–(c) above.

DETAILED DESCRIPTION OF THE INVENTION

Typically, polysuccinimides having a molecular weight in the range of 4,000 to 5,000 or 8,000 to 10,000 are employed to react with TAN. Such polymers are prepared by known means such as are described in U.S. Pat. No. 5,057,597, U.S. Pat. No. 5,315,010 and U.S. Pat. No. 5,319,145 which patents are hereby incorporated by reference. In all of these patents dryers of various types are employed in the reaction to convert aspartic acid into polyaspartic acid by thermal condensation. Catalysts such as phosphoric acid may be employed to aid in reducing the amount of time required to condense the 1-aspartic acid while subjected to heat and the removal of water in known manner. The polysuccinimide obtained from the thermal condensation reaction is employed directly in the reaction with TAN to provide the cross-linked polymers of the present invention.

The cross-linked polymers of this invention are prepared by reacting polysuccinimide with TAN in a solvent or liquid medium such as dimethylformamide (DMF) or water. The reaction occurs at room temperature or the process can be operated at reflux. The product is recovered by various means depending upon the reaction medium. For example, when employing DMF the medium is removed by distillation. The resulting cross-linked polymer is then subjected to basic hydrolysis to open the remaining succinimide rings not reacted with TAN.

Cross-linked polymers having a wide range of properties are prepared in accordance with this invention. The cross-linked polymers of this invention differ widely depending upon the degree of cross-linking achieved in the reaction of polysuccinimide and TAN. In large measure the degree of cross-linking is controlled by the amount of TAN employed in the reaction with polysuccinimide. For example, products are provided having varying water solubility as well as other properties by controlling the mole ratio of polysuccinimide to TAN. A summary of such compounds with respect to water solubility is provided in the table below wherein the mole ratio of polysuccinimide to TAN is shown along with the water solubility observations with respect to the product of the reaction. In each instance the cross-linked polymer is subjected to alkaline hydrolysis.

| Mole Ratio | Product Characteristics |
| --- | --- |
| 102 | Water soluble at 28 w/w %. |
| 20 | Formed a gel in water at 15.9 w/w %. |
| 9 | Insoluble but swelled with absorption. |
| 3 | Insoluble, no swelling. |

The above noted broad range of properties is believed to be due to the presence of three primary amines in TAN which have the opportunity to bond with different polymer chains at the three sites in the molecule. The invention conveniently provides a single, relatively inexpensive cross-linking agent which provides a wide range of products by simply changing the mole ratio of reactants.

Compounds of this invention are useful in a wide variety of applications including thickeners, deflocculants, flocculants and absorbers. Because of the number of amine groups in TAN, cross-linking is effected while still providing an un-reacted amino group which then provides the opportunity of an amine functionalized polymer having amine groups in a side-chain. Such molecules are possible drug carriers as noted in the Neuse et al. and Macromol. publications referred to above.

DESCRIPTION OF THE PREFERRED EMBODIMENTS

In the following examples all percentage values are percent by weight unless otherwise specified.

EXAMPLE 1

To a 500 ml flask were added 34.24 g (0.3527 mole) of polysuccinimide and 68.41 g of water. Then, 14.95 g of 50% sodium hydroxide and 1.73 g of TAN (0.00992 mole) in 21.77 g of water were added. To complete neutralization an additional 10.57 g of sodium hydroxide were added. The solution was heated to reflux for one hour. Then an additional 26.5 g of water was added to provide a 28.3 w/w % solution of cross-linked polymer. The polymer was analyzed by PSC and found to have the following: $M_n= 1,690$; $M_w= 6906$; $M_z= 26,921$. This data indicates an increase in molecular weight of about 70%.

EXAMPLE 2

To a 500 ml flask was added 34.24 g (0.3527 mole) of polysuccinimide and 86.12 g of water. To this were added 10.58 g of 50% sodium hydroxide. Then 3.45 g of TAN (0.01979 mole) was added. The solution was heated to reflux for 1 hour. After cooling, 12.72 g of 50% sodium hydroxide was added to complete neutralization and then 24.98 g of water was added to make a 28 w/w % solution. The sample was analyzed by PSC and found to have the following molecular weight: $M_n$=2,084; $M_w$=10,564; $M_z$=44,758. This data indicates an increase in molecular weight of 146%.

EXAMPLE 3

To a 14% solution of polysuccinimide (0.4785 mole) in DMF was added 27.37 g (0.1579 mole) of TAN. The reaction was exothermic and a red solid formed immediately. The temperature of the mixture was increased from 35° C. to 45° C. over a period of about 3 to 4 minutes and 46 g of additional DMF was added. The mixture was removed from the flask. Upon vacuum drying the solids weighed 71.7 g (N.B. 5391936), a 97.1% yield. The solid was placed in a capillary and placed in a melting point apparatus. The solid did not melt up to 320° C. Elemental analysis of the product indicated the following:

|  | Actual | | | Theory | | |
| --- | --- | --- | --- | --- | --- | --- |
|  | C | H | N | C | H | N |
| Starting | 47.03 | 3.30 | 13.76 | 49.9 | 3.11 | 14.43 |
| Product | 51.11 | 6.77 | 17.08 | 55.52 | 7.92 | 19.02 |

EXAMPLE 4

A solution of polysuccinimide in DMF was prepared containing 16.91 percent solids. To a 500 ml flask was added 191.6 g of the solution (0.333 mole) and 6.43 g of TAN (0.0371 mole) dissolved in 64.46 g of DMF. After 3 minutes the temperature rose from 26° C. to 31° C. and two phases formed. The mass was placed in a rotary evaporator and the DMF removed. The resulting 77.77 g of wet solid polymeric material was dried in a vacuum oven at 110° C. with reduced pressure for 16 hour. The dried polymer was a brown solid weighing 37.09 g. To a +100 g bottle was added 10.04 g of the dried material (0.0915 mole), 11 g of water and 4.88 g of 50% sodium hydroxide which provided a solution containing 27.82% of the sodium salt of the polymer. The liquids were totally absorbed by the polymer. An additional 21.28 g of water was added providing a slight exotherm occurred but the polymer did not dissolve.

EXAMPLE 5

To a 500 ml flask were added 123.1 g of an aqueous solution of polysuccinimide containing 20.82 g of the polymer (0.2145 mole) and 1.87 g (0.0108 mole) of TAN in 90.65 g of DMF. The mixture was held at a temperature in the range of 25° C. to 30° C. for two hours, then placed in a rotary evaporator to remove the DMF. A brown polymer was recovered weighing 28.44 g which was dried further in a vacuum oven at 110° C. under reduced pressure for 6 hours resulting in a polymer weighing 24.59 g. Further drying in the oven over night provided 24.15 g of polymer. To a bottle were added 12.74 g of the thus produced polymer together with 42.64 g of water and 8.92 g of 50% sodium hydroxide. The liquid was fully absorbed by the polymer. An additional 54 g of water were added in approximately 10–11 g increments five times, all of which was absorbed by the polymer. Upon addition of 8.08 g of additional water a gel formed. Upon addition of an additional 51.14 g of water a viscous fluid resulted. A solution was obtained upon addition of 21.56 g of water providing a concentration of 9.75% polymer in water.

In this example the cross-linked polyaspartate polymer remained solid after the addition of water at about 8 times its dry weight but resulted in a gel with the addition of water at 8.6 times its dry weight. A viscous colloidal dispersion was obtained with the addition of water at about 12.5 times its dry weight and less viscous colloidal dispersion resulted with the addition water at about 14 times its dry weight.

EXAMPLE 6

The procedure of Example 5 was repeated by combining 125.8 g (0.219 mole) of polysuccinimide with 0.002151 mole of TAN in 80 g of DMF. The resulting reaction provided 22.83 g of dry solid cross-linked polymer. To 11.04 g (0.1137 mole) of the polymer were added 35.5 g of water and 9.12 g of 50% sodium hydroxide providing a 28% solution.

EXAMPLE 7

The procedure of Example 5 was repeated by combining 130.5 g of an aqueous solution containing 22.07 g (0.2273 mole) of polysuccinimide with 0.6703 g (0.8039 mole) of TAN in DMF. The resulting reaction provided 24.18 g of polymer after drying. The polymer, 13.24 g, was combined with 41.01g of water and 10.37 g of 50% sodium hydroxide providing a 28% solution. The polymer dissolved rapidly and completely.

EXAMPLE 8

The procedure of Example 5 was repeated by combining 107.9 g of an aqueous solution of polysuccinimide containing 18.24 g of solids (0.188 mole) with 0.8297 g of TAN (0.004787 mole) in 100.05 g of DMF. The resulting reaction provided 26 g of polymer after drying. A 28% aqueous solution was provided by combining 10.11 g of the polymer with 36.93 g of water and 13.91 g of 50% sodium hydroxide.

EXAMPLE 9

The procedure of Example 5 was repeated by combining 132.4 g of an aqueous solution of polysuccinimide containing 20.85 g of solids (0.21248 mole) with 1.2662 g of TAN (0.007301 mole) in DMF. The reaction took place over 3 hours and resulted in the production of 23.36 g of dry polymer. Sufficient polymer was added to water and 8.14 g of 50% sodium hydroxide to provide a 28% solution. However, the presence of micelles indicated incomplete solution due to the degree of cross-linking.

Although the invention has been described in terms of specific embodiments which are set forth in considerable detail, it should be understood that this description is by way of illustration only and that the invention is not necessarily limited thereto since alternative embodiments and operating techniques will become apparent to those skilled in the art in view of this disclosure. Accordingly, modifications are contemplated which can be made without departing from the spirit of this described invention.

What is claimed is:

1. A crosslinked polyaspartic acid or salt thereof derived from polysuccinimide wherein the crosslinking agent is 4-aminomethyl-1,8-diaminooctane wherein the mole ratio of said polysuccinimide to said agent in the range of from about 3 to about 100.

2. A water soluble crosslinked polyaspartic acid or salt thereof at 28% by weight of claim 1, wherein the mole ratio of said polysuccinimide to said agent is in the range of from greater than 20 to about 100.

3. A crosslinked polymer of claim 2 wherein the average molecular weight is about 7,000.

4. A crosslinked polymer of claim 2 wherein the average molecular weight is about 10,000.

5. A polymer of claim 1 wherein the molecular weight of the polysuccinimide is in the range of from about 4,000 to about 5,000.

6. A polymer of claim 1 wherein the mole ratio is about 100.

7. A water insoluble crosslinked polyaspartic acid or salt thereof derived from polysuccinimide whrein the crosslinking agent is 4-aminomethyl-1,8-diaminooctane and wherein the mole ratio of said polysuccinimide to said agent is in the range of from about 3 to about 20.

8. A polymer of claim 6 wherein the mole ratio is about 9.

9. A polymer of claim 7 wherein the molecular weight of the polysuccinimide is in the range of from about 8,000 to about 10,000.

10. A polymer of claim 9 wherein the mole ratio is about 3.

11. A polymer of claim 6 wherein the mole ratio is 20.

* * * * *